Feb. 15, 1966     A. D. SWEDA     3,234,893
COLLAPSIBLE SUPPORT
Filed Dec. 9, 1964     3 Sheets-Sheet 1

INVENTOR.
ADAM D. SWEDA
BY Eugene N. Riddle
ATTORNEY

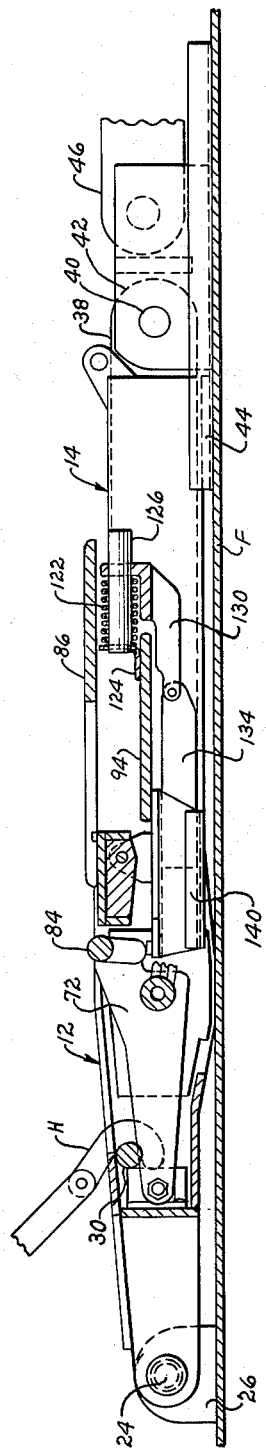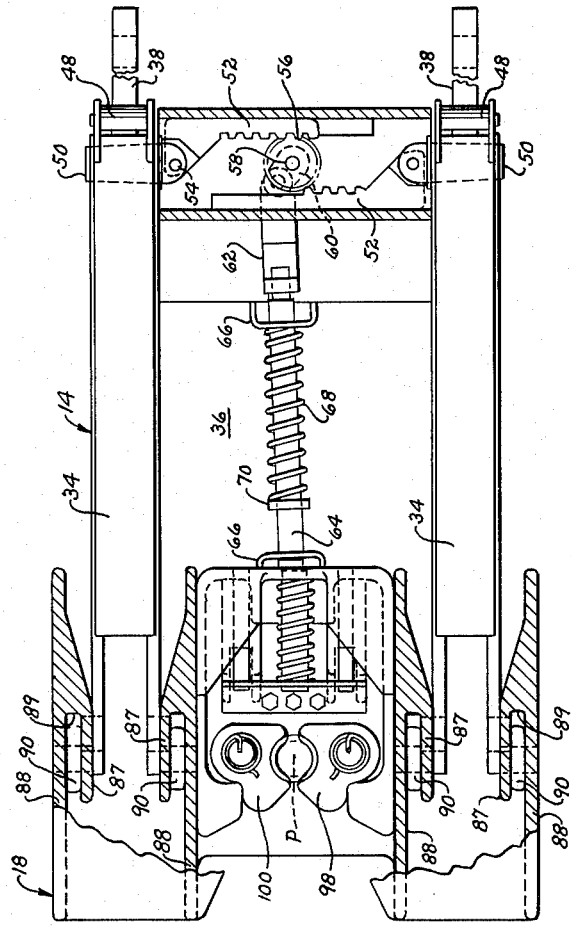

INVENTOR.
ADAM D. SWEDA
BY Eugene N. Riddle
ATTORNEY

United States Patent Office 3,234,893
Patented Feb. 15, 1966

3,234,893
COLLAPSIBLE SUPPORT
Adam D. Sweda, Florissant, Mo., assignor to ACF Industries Incorporated, New York, N.Y., a corporation of New Jersey
Filed Dec. 9, 1964, Ser. No. 417,138
5 Claims. (Cl. 105—368)

This invention relates to a collapsible support for containers, highway trailers and the like, and particularly to a collapsible support or hitch having a mounting plate or fifth wheel adapted to engage and secure a kingpin of highway trailers and the like which are loaded upon railway cars or ships for transport. As an example of a collapsible support to which this invention is particularly applicable, reference is made to copending application Ser. No. 324,461, filed Nov. 18, 1963, and entitled Collapsible Support, the entire disclosure of which is incorporated by this reference.

A hitch such as the type described in copending application Ser. No. 324,461 has a support member movable between a flat collapsed position and a generally vertical erect position with a mounting plate pivotally carried on the extending end of the support member. The hitch is adapted to be knocked down to collapsed position by the rear of a tractor and an actuating member engaged by the trailer to unlock the kingpin is mounted on the vertical member and projects from a side thereof to be easily engaged by the tractor. The locking member for locking the jaws about the kingpin is operatively connected by a suitable linkage to the actuating member. When the hitch is cushioned the mounting plate pivots relative to its vertical support member upon the exertion of buff and draft forces on the railway car which requires that the linkage permit such pivoting action without actuating the locking member and thereby inadvertently unlocking the kingpin. Further when the hitch is collapsed the mounting plate pivots relative to its support member and provision must be made in the linkage to permit this movement.

It is an object of the present invention to provide a hitch or fifth wheel stand adapted to engage a kingpin of a trailer and movable between collapsed and erect positions by a tractor.

An additional object of the present invention is the provision of a tractor actuated hitch in which inadvertent unlocking of the kingpin is eliminated while relative pivotal movement is permitted between the vertical support member and the mounting plate.

A further object of this invention is the provision of such a hitch in which the locking jaws for the kingpin are continuously biased to an open position thereby to prevent inadvertent closing of the jaws.

The invention accordingly comprises the constructions hereinafter described, the scope of the invention being indicated in the following claims.

In the accompanying drawings, in which one of various possible embodiments of the invention is illustrated, FIGURE 1 is a fragmentary side elevational view of a trailer secured to a railway flat car by the trailer hitch comprising the present invention with a tractor shown by actuating the hitch;

FIGURE 3 is an enlarged plan view of the hitch with certain parts broken away and showing means to secure the kingpin of a trailer and means to lock the hitch in raised position, the kingpin securing means being shown in locked position about a kingpin of a trailer;

FIGURE 7 is an elevational view of the hitch in collapsed position with certain parts broken away.

Corresponding reference characters indicate corresponding parts throughout the several views of the drawings.

Figure 1:
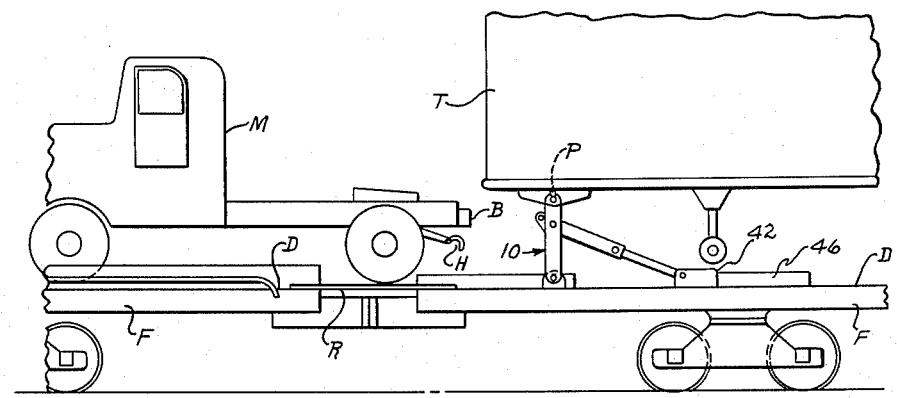

Referring to the drawings, and particularly to FIGURE 1, railway flat cars F are coupled to each other and and their floor or deck plates D are spanned by bridge plates R. A tractor M is supported on bridge plates R when moving from one flat car to another. A trailer T is partially shown in FIGURE 1 and a collapsible trailer hitch or support indicated generally at 10 is mounted on flat car F. Trailer T has a kingpin P extending from its front end (see also FIGURES 3 and 4) which is engaged and locked in position to hold the associated trailer in secured position. Flat car F is of a low level type in which the deck height is minimized. While hitch 10 is illustrated in the drawings as mounted on a railway flat car, it is to be understood that the hitch may be mounted on other transporting means, such as, for example, barges, ships, or the like.

Referring to FIGURES 2–5, hitch 10 comprises a vertical support member generally designated 12 and a diagonal support member generally designated 14 pivotally connected about horizontal pivot 16 to vertical support member 12. A supporting plate structure generally designated 18 is pivotally connected about horizontal pivot 20 to the extending end of vertical support member 12. Hitch 10 is adapted to be pulled from a collapsed position to an erect position by a hook H on the rear of tractor M upon forward movement of the tractor. A bumper block B on the rear of tractor M is adapted to knock hitch 10 to a collapsed position from erect position upon rearward movement of tractor M and effect unlocking of the trailer kingpin P and unlocking of diagonal support member 14 to permit collapsing of hitch 10, as will be explained more fully.

Vertical support member 12 has spaced lower legs 22 pivotally connected at 24 to lugs 26. The front face of vertical support 12 has an open pocket 28 in which a pull bar 30 is secured. To erect hitch 10 from the position shown in FIGURE 7, pull bar 30 is engaged by hook H mounted on the end of tractor M.

Diagonal support member 14 comprises a pair of upper boxed-shaped diagonal legs 34 connected by a bottom plate 36. Telescoped within each box-shaped leg 34 is a separate lower leg 38 of a generally rectangular cross-sectional area. Each leg 38 is pivotally mounted at 40 to a shoe 42 mounted for cushioned back and forth sliding movement along floor plate F along guide rails 44 secured to deck F as shown in FIGURE 7. Shoe 42 is operatively connected to a cushioning unit 46 shown in FIGURE 1 and slides back and forth upon impact and draft forces being exerted against railway car F. If cushioning is not desired, diagonal support member 14 may be fixed to deck F.

To hold legs 34 and 38 in proper aligned position when the hitch is erected aligned openings are formed in legs 34 and 38. Locking pins 50 are inserted through the aligned openings in legs 34, 38 to lock diagonal support member 14 in the erect position of the hitch. To decrease frictional contact between legs 34, 38 when the hitch is moved between collapsed and erect position, a roller 48 is carried by each leg 34 for riding along the adjacent top surface of the associated telescoping leg 38.

Figures 2, 4:
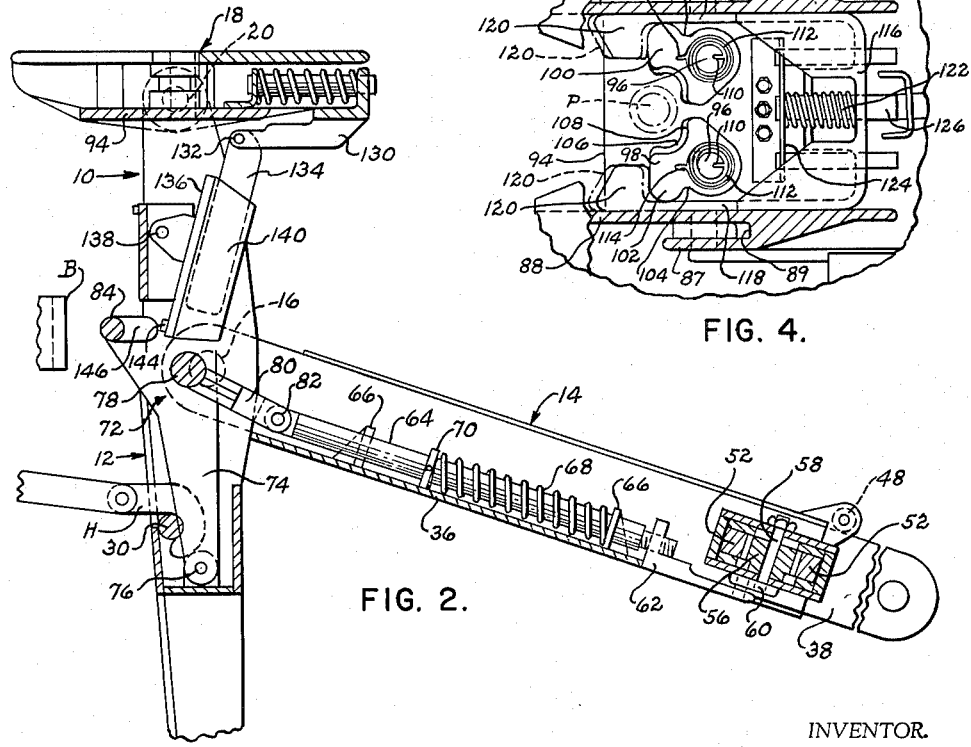
FIGURE 2 is a partial side elevational view of the hitch with certain parts broken away and illustrating the locked position of the kingpin securing means and the erected locked position of the hitch.
FIGURE 4 is an enlarged plan view of the mounting plate structure shown in FIGURE 3 with certain parts broken away and showing the kingpin securing means in unlocked position.

Referring to FIGURES 2 and 3, locking means to move pins 50 in and out of locking position include racks 52 pivotally connected at 54 to pins 50. A pinion 56 on shaft 58 engages racks 52 and a suitable housing encloses pinion 56 and racks 52. A lever or arm 60 is fixed to the lower end of shaft 58 and a link 62 is pivotally connected to arm 60. Rod 64 is mounted for longitudinal movement within suitable openings of projections 66 secured to bottom plate 36. Spring 68 is compressed between a stop 70 secured to rod 64 and rearward projection 66 to bias rod 64 and pinion 56 in a direction to urge pins 50 outwardly in locked position with legs 34 and 38.

Figure 5:
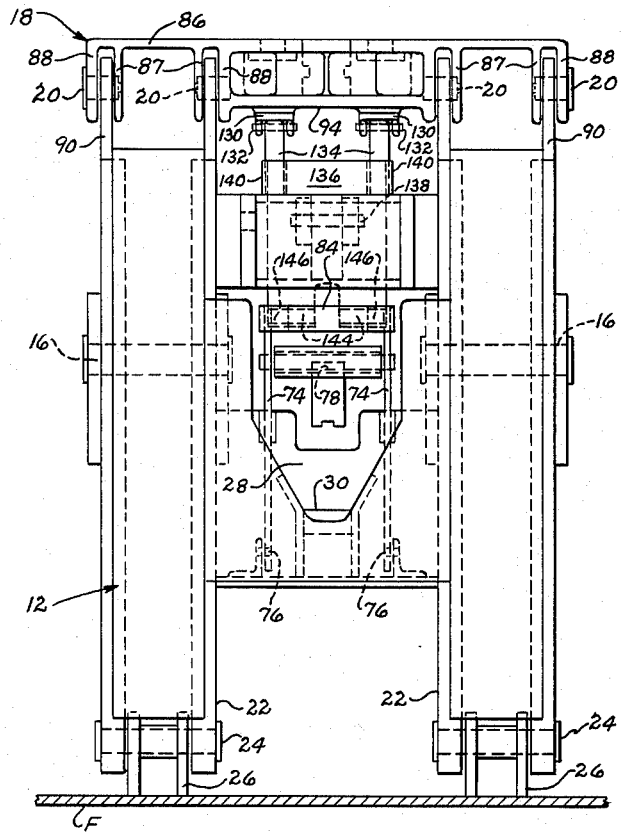
FIGURE 5 is a front elevational view of the hitch of FIGURES 2, 3 and 4 illustrating the hitch in a raised position.

For moving rod 64 and pinion 56 in an opposite direction for unlocking legs 34 and 38 to permit collapsing of hitch 10, a push lever or actuating member 72 has legs 74 pivoted at 76 on vertical support member 12 as shown in FIGURES 2 and 5. A horizontal cross member 78 extends between legs 74 and has a link 80 pivoted at 82 to rod 64. A horizontal push bar 84 connects legs 74 and is positioned forwardly of vertical support member 12. Lever 72 is urged outwardly by the bias of spring 68 and rod 64 to project push bar 84 forwardly of vertical support 12. To knock hitch 10 from erect position to collapsed position, bumper block B on the rear of tractor M engages push bar 84 upon rearward movement of the tractor to move rod 64 and rotate pinion 56 for pulling pins 50 from the openings within telescoping legs 34 and 38, the rearward movement of the tractor knocking hitch 10 to collapsed position. For further details of telescoping legs 34, 38 and cushioning unit 46 reference is made to the above mentioned copending application Serial No. 324,461.

Mounting plate structure 18 comprises an upper plate 86 having short ribs 87 and long ribs 88 on the undersurface thereof of which form slots 89 to receive fingers 90 extending from vertical support 12. Fingers 90 are pivotally connected to ribs 87 and 88 about pivots 20 thereby mounting supporting plate structure 18 for pivotal movement relative to vertical support 12. The slots 89 formed between ribs 87 and 88 are only slightly deeper than the projecting ends of fingers 90 and the pivoting of plate structure 18 in a clockwise direction as viewed in FIGURE 2 is limited by contact of fingers 90 with the surfaces defining the inner portions of slots 89 as shown in FIGURE 4.

Extending between a pair of inner ribs 88 is a lower plate 94 forming a pocket between lower plate 94 and upper plate 86 as shown in FIGURE 5. Mounted on lower plate 94 for free rotation on pins 96 are complementary facing locking jaws 98 and 100 adapted to engage and secure kingpin P of trailer T. Each jaw 98, 100 has a rounded knob 102 formed with a notch 104. A kingpin seat 106 on each jaw has an arcuate projection or shoulder 108 adapted to engage a grooved portion in a conventional kingpin P.

To urge each jaw 98, 100 continuously to an open position as indicated in FIGURE 4, each pin 96 has a slot 110 receiving an end of a torsion spring 112. The other opposite end of torsion spring 112 is mounted in a slot 114 of each jaw to urge the respective jaw to an outward direction. Torsion spring 112 constitutes an important feature of the present invention and insures that the jaws will be held open until engaged by a kingpin and moved to a closed position thereby thus preventing inadvertent swinging of the jaws to a closed position before a kingpin contacts the jaws.

To hold jaws 98, 100 in closed position about a kingpin as shown in FIGURE 3 and in open position as shown in FIGURE 4, a yoke or slide 116 has a pair of arms 118 fitting respectively between and mounted for sliding movement along inner ribs 88. A hook portion 120 on the end of each arm 118 is adapted to fit within a mating groove 104 of the respective adjacent jaw to lock the jaw in closed position as shown in FIGURE 3. A spring 122 compressed between yoke 116 and a bracket or stop 124 secured to lower plate 94 to bias yoke 116 in a rearward direction. Spring 122 telescopes a rod 126 secured to bracket 124.

Figure 6:
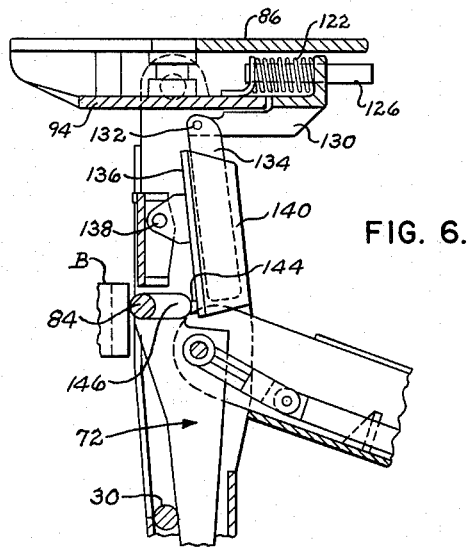
FIGURE 6 is a fragmentary side elevational view similar to FIGURE 2 but illustrating the unlocking of the trailer kingpin and unlocking of the hitch immediately before collapsing of the hitch.

To actuate yoke 116 and constituting an important feature of the present invention, means to move slide or yoke 116 between locked and unlocked positions relative to jaws 98, 100 is indicated in FIGURES 2, 5 and 6. Two spaced arms 130 are secured to the underside of yoke 116. Pivotally mounted to each arm 130 at 132 is a link 134. To restrain and actuate link 134, a pivot plate 136 is pivotally mounted at 138 to vertical support 12. An open end box-shaped extension 140 is formed on each side of pivot plate 136 and receives an associated link 134 in telescoping relation to permit free slippage between links 134 and extensions 140. The lower end of pivot plate 136 is biased by spring 122 against lever 72 and has a pair of spaced projections 144 adapted to bear against complementary spaced lugs 146 secured to bar 84 on lever 72.

Referring to FIGURE 6, locking lever 72 is shown engaged by bumper block B and pushed inwardly to a position unlocking kingpin P and diagonal support member 14 immediately before collapsing of hitch 10. In this position, pivot plate 136 is pivoted counterclockwise to pull arms 130 forwardly thereby moving yoke 116 forwardly to release each jaw 98, 100. The position of yoke 116 in its foremost position to permit opening of jaws 98, 100 is shown in the broken line indication of hook portions 120 in FIGURE 4. Upon collapsing of hitch 10 and the movement of jaws 98, 100 away from kingpin P, torsion springs 112 snap jaws 98, 100 to open position and thereafter yoke 116 moves rearwardly slightly to the position of FIGURE 4 in engagement with rounded knobs 102.

As shown in FIGURES 2 and 3 in the locked position of jaws 98, 100 about kingpin P, yoke 116 is in its rearmost position. When impact forces are exerted adjacent flat car F and vertical support member 12 is pivoted about pivot 24 in a counterclockwise direction, support plate structure 18 pivots about pivot 20 relative to support member 12 as supporting plate structure 18 remains in a generally horizontal plane during pivoting of support member 12. If no slippage were provided between pivot plate 136 and arms 130, yoke 116 would be moved in a direction to unlock jaws 98, 100. Telescoping links 134 and box-shaped extensions 140 thus permit supporting plate structure 18 to pivot freely about pivot 20 without any inadvertent unlocking of jaws 98, 100. Also, when hitch 10 is collapsed and moved to the position of FIGURE 7, supporting plate structure 18 is pivoted a maximum amount to a flat relation with vertical support 12 with links 134 in full extended position to insure that jaws 98, 100 are open even though yoke 116 should move forwardly from the position of FIGURE 4, torsion springs 113 continuously urge jaws 98, 100 to closed position. Then, when kingpin P contacts jaws 98, 100 upon erection of hitch 10, knobs 102 ride yoke 116 to closed position about kingpin P and load torsion springs 112.

Operation is as follows:

Upon rearward movement of tractor M, pusher bar 84 and lever 72 are pushed inwardly to the position shown in FIGURE 6 upon contact with bumper block B. Initial movement of lever 72 pivots plate 136 about pivot 138 in a counterclockwise direction to move yoke 116 and hook portions 102 from within notches 104. Actuating rod 64 is moved rearwardly by lever 72 to rotate pinion 56 and retract locking pins 50 from the openings of legs 34 and 38. The linkages are so arranged that jaws 98, 100 are unlocked substantially simultaneously with or slightly after the unlocking of telescoping legs 34, 38.

Further rearward movement of tractor M causes bumper block B to engage and push vertical support 12 about pivot 24, and kingpin P swings jaws 98, 100 to open position upon movement of support plate structure 18 away from the kingpin P. The ends of pins 50 ride against the adjacent surface of legs 38 upon collapsing of the hitch and thereby keep lever 72 from returning to its original position forwardly of vertical support member 12.

For raising the hitch from collapsed position, hook H engages rod 30 and the tractor is moved forwardly to pivot vertical support member 12 to erect position. Suitable aligning means properly align the openings in legs 34 and 38 when the hitch is erected and locking pins 50 move into the aligned openings under the bias of spring 68 and pinion 56. This permits lever 72 to pivot outwardly with yoke 116 and jaws 98, 100 remaining in the position shown in FIGURE 4. Once the hitch is erected, the trailer may be lowered from the fifth wheel of tractor M to supporting position on supporting plate structure 18 with the kingpin P slightly forward of jaws 98, 100. Then, a rearward push against trailer T by tractor M or the raising of the fifth wheel on the tractor adjacent the lower front edge of the trailer T moves trailer T rearwardly and slides kingpin P into contact with jaws 98, 100. Contact of kingpin P against open jaws 98, 100 moves yoke 116 slightly forward viewing FIGURE 4 to permit jaws 98, 100 to ride over hook portions 102 and to pivot about kingpin P. Then, spring 122 biases yoke 116 to the position shown in FIGURE 3 to lock the jaws 98, 100 about kingpin P. Locking pins 50 are easily visible from a position remote from the hitch for determining when the hitch is positively locked in raised position without any danger to the operator of the hitch. When kingpin P is unlocked, pin 126 projects as shown in FIGURE 6 and is easily visible. When kingpin P is locked, pin 126 is in its position shown in FIGURE 2 which is easily checked from a position remote from the hitch to insure that jaws 98, 100 are locked.

In some instances, trailers and the like may be loaded on barges and ships, as well as railway cars, by cranes. In this event, it would not be desirable to move the hitch to a collapsed position and a tractor would not be employed to collapse the hitch. Thus, it is desirable that yoke 116 may be moved independently of push lever 72. A suitable manual type lever (not shown) may be applied against plate member 136 to pivot plate 136 about pivot 138 thereby to move yoke 116 and unlock jaws 98, 100 independently of the unlocking of diagonal support member 14 and independently of push lever 72.

In view of the above, it will be seen that the several objects of the invention are achieved and other advantageous results obtained.

As various changes could be made in the above constructions without departing from the scope of this invention, it is intended that all matter contained in the above description or shown in the accompanying drawings shall be interpreted as illustrative and not in a limiting sense.

What is claimed is:

1. A fifth wheel stand adapted to engage a kingpin of a trailer or the like comprising, a support structure movable between a collapsed inoperative position and a raised operative position, said support structure when in raised position having a generally vertical support member and a diagonal support member connected to the vertical member on the rearward side thereof adjacent the trailer or the like, a supporting plate structure carried by and mounted on the extending end of said vertical support member for relative pivotal movement in a vertical plane, said supporting plate structure comprising a pair of spaced generally parallel horizontally extending plates with the upper plate having a forwardly facing opening therein adapted to receive the kingpin, a pair of oppositely facing jaws between said plates adjacent the opening and pivoted for movement about vertical axes between open and closed positions with respect to the kingpin, a locking member between the parallel plates being supported by the lower plate and having a pair of spaced yoke arms extending in a forward direction, one of said arms extending alongside the outer side of one jaw and the other arm extending alongside the outer side of the other jaw, each of said arms being formed adjacent its extending end with a hook portion to engage and lock the adjacent jaw in closed position about the kingpin of a trailer, separate means for each jaw to bias the respective jaw continuously to open position, means to bias the locking member continuously in a rearward direction with said hook portions continuously engaging said jaws, said jaws being engaged and releasably retained by said hook portions in said open position of the jaws and being swung to closed position when engaged by the kingpin of a trailer or the like, a lever mounted on said vertical support member for pivotal movement about a generally horizontal axis and operatively connected adjacent its upwardly extending end to said locking member rearwardly of said jaws, and an actuating member projecting from the side of the vertical support member opposite the diagonal member and operatively connected to said lever whereby upon movement of the actuating member in a rearward direction the lever is pivoted to move the locking member to an unlocked position with said jaws being biased open to release the kingpin of the trailer.

2. A fifth wheel stand as set forth in claim 1 wherein said lever comprises a pair of telescoping portions adapted for movement relative to each other upon pivoting of the supporting plate structure relative to the vertical support member, one of the telescoping portions being pivotally connected to the vertical support member and the other telescoping portion being pivotally mounted to the locking lever thereby to provide a variable length linkage.

3. A fifth wheel stand as set forth in claim 1 wherein said separate means for each jaw comprises a torsion spring mounted about the vertical axis of each jaw to bias continuously each jaw to open position.

4. A fifth wheel stand adapted to engage a kingpin of a trailer or the like comprising, a support structure movable between a collapsed inoperative position and a raised operative position, said support structure when in raised position having a generally vertical support member and a diagonal support member connected to the vertical member on the side thereof adjacent the trailer or the like, a supporting plate structure carried by and mounted on the extending end of said vertical support member for relative pivotal movement in a vertical plane, said supporting plate structure comprising a pair of generally parallel horizontally extending plates with the upper plate having a forwardly facing opening therein adapted to receive the kingpin, a pair of oppositely facing jaws between the plates adjacent the opening and pivoted for movement about vertical axes between open and closed positions with respect to the kingpin, a locking member carried by the supporting plate structure between said plates and adapted to engage and lock the jaws in closed position about the kingpin of a trailer, said locking member having an arm fixed thereto extending beneath the bottom plate of said supporting plate structure, a linkage mounted on said vertical support member and connected to said arm rearwardly of said jaws, said linkage comprising a pair of telescoping portions adapted for relative lengthwise movement upon pivoting of said supporting plate structure, one of said portions being pivotally mounted on said vertical support member for movement about a generally horizontal axis and the other of said portions being pivotally mounted to said arm, and an actuating member projecting from the side of the vertical support member opposite the diagonal member and operatively connected to said one portion whereby upon movement of the actuating member in a rearward direction the telescoping portions are pivoted to move the locking member to an unlocked position to release the kingpin of the trailer.

5. A fifth wheel stand adapted to engage a kingpin of a trailer or the like comprising, a support structure movable between a collapsed inoperative position and a raised operative position, said support structure when in raised position having a generally vertical support member and a diagonal support member connected to the vertical member on the side thereof adjacent the trailer or the like, a supporting plate structure carried by and mounted on the extending end of said vertical support member for relative pivotal movement in a vertical plane, said supporting plate structure comprising a pair of generally parallel horizontally extending plates with the upper plate having a forwardly facing opening therein adapted to receive the kingpin, a pair of oppositely facing jaws between the plates adjacent the opening and pivoted for movement about vertical axes between open and closed positions with respect to the kingpin, a locking member carried by the supporting plate structure between said plates and adapted to engage and lock the jaws in closed position about the kingpin of a trailer, said locking member having an arm fixed thereto extending beneath the bottom plate to said supporting plate structure, a linkage mounted on said vertical support member and connected to said arm rearwardly of said jaws, said linkage comprising a pair of telescoping portions adapted for relative lengthwise movement upon pivoting of said supporting plate structure, one of said portions being pivotally mounted on said vertical support member for movement about a generally horizontal axis and the other of said portions being pivotally mounted to said arm, said diagonal support member movable between an extended position in the raised position of the support structure and a retracted position in the collapsed position of the support structure, means movable between locked and unlocked positions for releasably locking the diagonal member in extended position and permitting movement of the diagonal member to retracted position only when unlocked, said vertical support member and said supporting plate structure swinging in a rearward direction toward the trailer upon collapsing of the hitch from raised position and said supporting plate structure pivoting relative to the vertical support member to remain in a generally horizontal plane when the stand is collapsed, said telescoping portions being extended to a maximum extent upon collapsing of the fifth wheel stand, and an actuating member projecting from the side of the vertical support member opposite the diagonal member and operatively connected to said one portion whereby upon movement of the actuating member in a rearward direction the telescoping portions are pivoted to move the locking member to an unlocked position to release the kingpin of the trailer.

References Cited by the Examiner
UNITED STATES PATENTS

| | | | |
|---|---|---|---|
| 1,540,088 | 6/1925 | Rasmussen | 292—99 X |
| 2,005,722 | 6/1935 | Ketel et al. | 280—435 |
| 2,031,738 | 2/1936 | Schoch | 292—164 X |
| 2,096,282 | 10/1937 | Kortering | 280—435 |
| 3,142,466 | 7/1964 | Gutridge et al. | 248—119 |
| 3,164,346 | 1/1965 | Bateson | 248—119 |
| 3,168,878 | 2/1965 | Clejan | 105—368 |

ARTHUR L. LA POINT, *Primary Examiner.*